(No Model.)
G. H. MALTER.
ORE CONCENTRATOR.
No. 307,560. Patented Nov. 4, 1884.
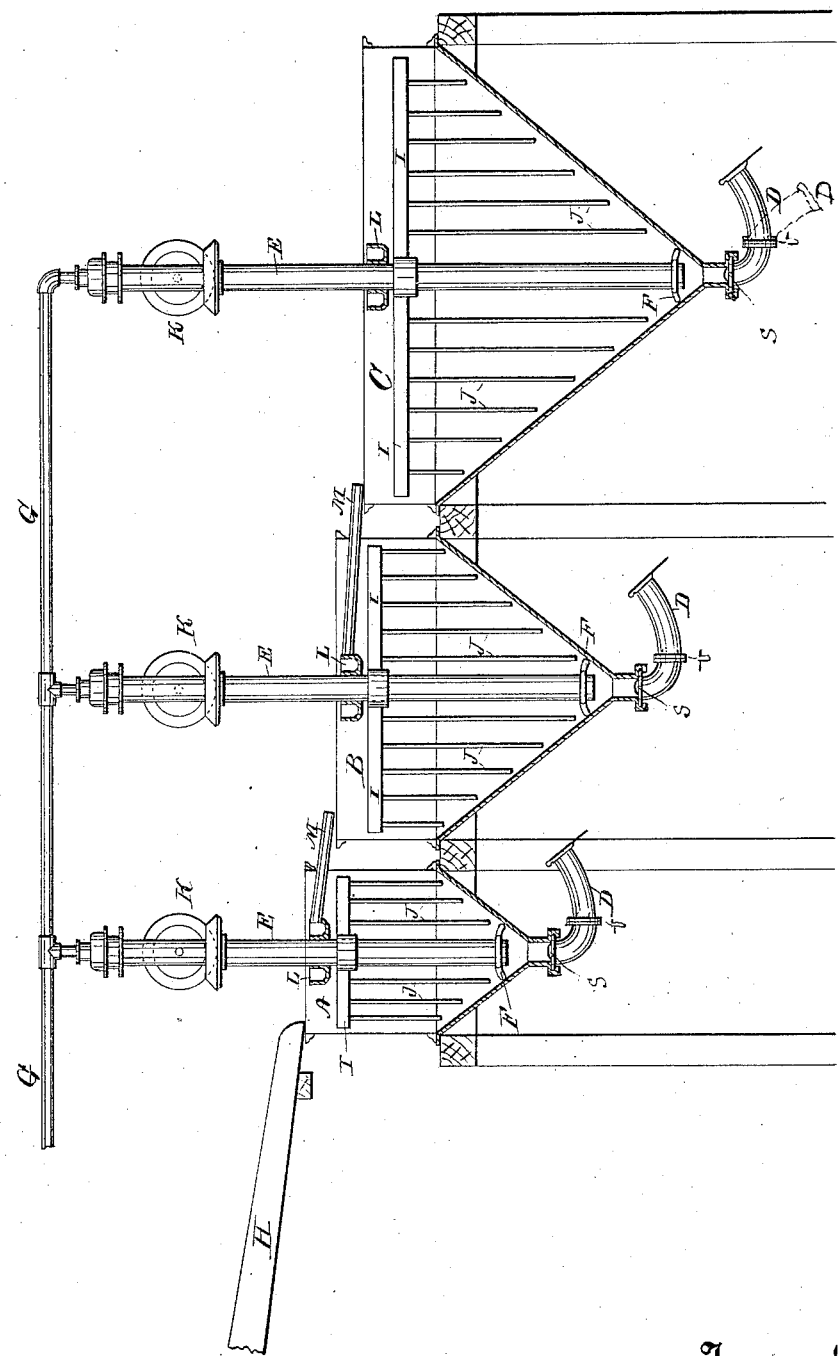
Witnesses,
Geo. H. Strong.
J. A. Howard
Inventor
Geo. H. Malter
By Dewey & Co.
Attorneys

UNITED STATES PATENT OFFICE.

GEORGE H. MALTER, OF SAN FRANCISCO, CALIFORNIA.

ORE-CONCENTRATOR.

SPECIFICATION forming part of Letters Patent No. 307,560, dated November 4, 1884.

Application filed November 12, 1883. Renewed August 13, 1884. (No model.)

*To all whom it may concern:*

Be it known that I, GEORGE H. MALTER, of the city and county of San Francisco and State of California, have invented an Improvement in Ore-Concentrators; and I do hereby declare the following to be a full, clear, and exact description thereof.

My invention relates to an apparatus for concentrating ores or tailings; and it consists of the combination of devices hereinafter explained and claimed, all of which will be more fully pointed out by reference to the accompanying drawing, in which the figure is a vertical section taken longitudinally through the center of the tubs.

A B C are the settling tubs or tanks. When more than one are used, they are placed in a row, so that the first shall discharge into the second, and the second into the third, and so on. These tubs also increase in size as they progress. They are here shown with vertical cylindrical sides and deep conical bottoms, but may be of different forms, with outlet-pipes D, which have their discharge ends swiveled at V, or otherwise so made that they may be turned up or down at will, and may be provided with valves s to control the rate of discharge. From a point at some height above each vessel a tubular shaft, E, extends nearly to the bottom of the vessel at its center, and its lower end is guided and steadied by a spider or arms, F, which extend from it to the sides of the conical bottom, as shown. This tube receives water from a main pipe, G, at such a height above the vessel that the pressure causes a current to flow out into the pan from its lower end. This water enters the vessel near the bottom of the cone, and rises up through the pulp, which is discharged into the vessel by means of a sluice, H, at its top and on one side. The tubular shaft E has arms I fixed to it at a point just below the level of the top of the pan, and vertical arms or stirrers J extend downward from these arms to points near the bottom of the vessel. As the bottom is conical, it will be seen that these arms increase in length from the circumference toward the center, in order to bring their ends near the sides of the cone and produce a suitable agitation of the contents. The shaft and arms are caused to rotate by bevel-gearing K, driven by shafts above the vessels, as shown, or by other suitable apparatus.

At a point just below the level of the top of the vessel a receiver or box, L, is supported at or near the center of the vessel, so that the lighter tailings carried up by the water may flow over its sides into it and be carried from it out through a sluice or pipe, M.

The operation is as follows: Pulp being admitted through the sluice H falls down toward the bottom of the vessel, where it meets a current of water flowing upward from the bottom of the cone, where it enters through the hollow shaft E. The arms J, being set in motion, will stir and agitate the mass, throwing the heavier particles outward, where they fall upon the inclined conical bottom and slide downward to the discharge-pipe, through which they are allowed to pass out as desired. The lighter tailings are carried upward by the current of water and flow over into the central receiver or box, L, from which they pass out through the pipe M, and if a series of tubs are used they fall into the next one below, to pass through a similar operation therein.

Having thus described my invention, what I claim as new, and desire to secure by Letters Patent, is—

In a concentrating apparatus, a tub having a conical bottom, means for supplying pulp thereto, a pipe through which water is discharged into the bottom of the cone to create an upward current, a centrally-placed receiver near the top of the tub, into which the tailings may overflow, an overflow-pipe, and an adjustable discharge-pipe at the bottom of the cone for the heavier particles, in combination with a series of arms or stirrers projecting downward into the tub, and means for rotating the same, whereby a centrifugal action is produced and the heavier particles separated from the lighter, substantially as described.

In witness whereof I have hereunto set my hand.

GEORGE H. MALTER.

Witnesses:
S. H. NOURSE,
C. D. COLE.